United States Patent
Nakayama et al.

(10) Patent No.: US 10,673,241 B2
(45) Date of Patent: Jun. 2, 2020

(54) DEMAND CHARGE AND RESPONSE MANAGEMENT USING ENERGY STORAGE

(71) Applicant: NEC Laboratories America, Inc., Princeton, NJ (US)

(72) Inventors: Kiyoshi Nakayama, Santa Clara, CA (US); Ratnesh Sharma, Fremont, CA (US); Ali Hooshmand, San Jose, CA (US)

(73) Assignee: NEC Corporation (JP)

(*) Notice: Subject to any disclaimer, the term of this patent is extended or adjusted under 35 U.S.C. 154(b) by 25 days.

(21) Appl. No.: 16/185,300

(22) Filed: Nov. 9, 2018

(65) Prior Publication Data
US 2019/0148945 A1 May 16, 2019

Related U.S. Application Data

(60) Provisional application No. 62/584,964, filed on Nov. 13, 2017, provisional application No. 62/599,278, filed on Dec. 15, 2017.

(51) Int. Cl.
*H02J 3/32* (2006.01)
*G06Q 10/06* (2012.01)
(Continued)

(52) U.S. Cl.
CPC ............. *H02J 3/32* (2013.01); *G05B 13/048* (2013.01); *G06Q 10/06315* (2013.01);
(Continued)

(58) Field of Classification Search
None
See application file for complete search history.

(56) References Cited

U.S. PATENT DOCUMENTS

| 2005/0138929 A1* | 6/2005 | Enis | F28D 20/00 60/641.8 |
| 2013/0030590 A1* | 1/2013 | Prosser | H02J 3/28 700/295 |

(Continued)

OTHER PUBLICATIONS

Hanna, "Energy Dispatch Schedule Optimization for Demand Charge Reduction Using a Photovoltaic-Battery Storage System with Solar Forecasting", Solar Energy 103, May 2014, pp. 269-1287.

(Continued)

*Primary Examiner* — Ryan A Jarrett
(74) *Attorney, Agent, or Firm* — Joseph Kolodka

(57) ABSTRACT

Systems and methods for controlling battery charge levels to maximize savings in a behind the meter energy management system include predicting a demand charge threshold with a power demand management controller based on historical load. A net energy demand is predicted for a current day with a short-term forecaster. A demand threshold maximizes financial savings using the net energy demand using a rolling time horizon optimizer by concurrently optimizing the demand charge savings and demand response rewards. A load reduction capability factor of batteries is determined with a real-time controller corresponding to an amount of energy to fulfill the demand response rewards. The net energy demand is compared with the demand threshold to determine a demand difference. Battery charge levels of the one or more batteries are controlled with the real time controller according to the demand difference and the load reduction capability factor.

20 Claims, 10 Drawing Sheets

(51) Int. Cl.
- G06Q 50/06 (2012.01)
- G05B 13/04 (2006.01)
- H02J 13/00 (2006.01)
- G06Q 30/04 (2012.01)
- H02J 3/38 (2006.01)
- H02J 7/00 (2006.01)
- H02J 3/00 (2006.01)
- G05B 13/02 (2006.01)

(52) U.S. Cl.
CPC ............. *G06Q 30/04* (2013.01); *G06Q 50/06* (2013.01); *H02J 3/382* (2013.01); *H02J 7/0021* (2013.01); *H02J 13/0006* (2013.01); *G05B 13/0265* (2013.01); *H02J 3/003* (2020.01); *H02J 2203/20* (2020.01)

(56) References Cited

U.S. PATENT DOCUMENTS

| | | | | |
|---|---|---|---|---|
| 2015/0303690 | A1* | 10/2015 | Miyazaki | H02J 7/34 700/291 |
| 2018/0254632 | A1* | 9/2018 | Elbsat | G06Q 50/06 |

OTHER PUBLICATIONS

Neubauer, "Deployment of Behind-the-Meter Energy Storage for Demand Charge Reduction", NREL, Jan. 2015, 30 pages.

Wang, "Stochastic Demand Charge Management for Commercial and Industrial Buildings", IEE PES General Meeting, Jul. 2017, 5 pages.

Moslemi, "A Machine Learning Based Demand Charge Management Solution", IEEE PES ISGT Europe Conference, Sep. 2017, 6 pages.

Abikarram, "Minimization of Energy Costs Considering Demand Charge Under Time of Use and Real Time Pricing Policies", Dissertation Rochester Institute of Technology, Jul. 2017, 45 pages.

Van De Ven, "Optimal Control of Residential Energy Storage Under Price Fluctuations", Proceedings of IARIA Energy Conference, Jan. 2011, 4 pages.

Su, "Modeling and Analysis of the Role of Fast Response Energy Storage in the Smart Grid", Proceedings of 49th Annual Allerton Conference of Communication, Control, and Computing, Sep. 2011, pp. 719-726.

Koutsopoulos, "Optimal Energy Storage Control Policies for the Smart Power Grid", Proceedings of IEEE International Conference on Smart Grid Communications, Oct. 2011, 6 pages.

Li, "Optimal Demand Response Based on Utility Maximization in Power Networks", IEEE Power and Energy Society General Meeting, Jul. 2011, 8 pages.

Huang, "Optimal Demand Response with Energy Storage Management" IEEE 3rd International Conference on Smart Grid Communications, May 2012, pp. 61-66.

* cited by examiner

DEMAND CHARGE AND RESPONSE MANAGEMENT USING ENERGY STORAGE

BACKGROUND

Technical Field

The present invention relates to energy management and more particularly demand charge and demand response management using energy storage.

Description of the Related Art

Consumer can often be charged by demand network operators (DNOs) for energy use according to a variety of factors. For example, time-of-use can be charged according to when measured amounts of power are demanded from the grid, such as, e.g., during off-peak periods, partial peak periods, and peak periods. Additionally, consumers can also be charged increased rates for increased maximum power demand, otherwise known as demand charges. To reduce energy demanded from the grid while also increasing participation in demand response rewards offered by the DNOs, consumers may utilize behind the meter (BTM) energy management systems (EMS) that may include off-grid batteries or off-grid renewable energy sources such as, e.g., photovoltaics, wind, geothermal, among other sources of energy.

The behind the meter power management systems can be used to supplement power demanded from a grid by commercial and industrial customers. However, optimizing a BTM-EMS for any one of the various rate factors, including demand charges, time-of-use charges, and savings for demand response can result in failure to account for greater savings in the other factors because of competing optimizations.

SUMMARY

According to an aspect of the present principles, a method is provided for controlling battery charge levels to maximize power demand savings in a behind the meter energy management system. The method includes predicting a demand charge threshold with a power demand management controller based on historical load to reduce peak demand charges. A net energy demand is predicted for a current day with a short-term forecaster. A demand threshold is determined for maximizing financial savings using the net energy demand using a rolling time horizon optimizer by concurrently optimizing the savings associated with both the demand charge rates and the time-of-use rates, and the demand response rewards. A load reduction capability factor of one or more batteries is determined with a real-time controller, the load reduction capability factor corresponding to an amount of energy required to fulfill a load reduction corresponding to at least one of the demand response rewards. The net energy demand is compared with the demand threshold to determine a demand difference with the real-time controller. Battery charge levels of the one or more batteries are controlled with the real time controller according to the demand difference and the load reduction capability factor.

According to another aspect of the present principles, a method is provided for controlling battery charge levels to maximize power demand savings in a behind the meter energy management system. The method includes recording a power load demand, including a real-time load demanded from an energy distribution network and a renewable energy source utilization.

A demand charge threshold is predicted with a power demand management controller based on historical load to reduce peak demand charges, including determining a billing cycle demand charge threshold based on historical loads from past billing cycles with a medium-term layer controller and optimizing the demand charge threshold for a current period shorter than the billing cycle using the real-time load and the renewable energy source utilization with a short-term layer controller. A net energy demand is predicted for a current day with a short-term forecaster. A demand threshold for maximizing financial savings is determined using the net energy demand using a rolling time horizon optimizer by concurrently optimizing the savings associated with both the demand charge rates and the time-of-use rates, and the demand response rewards. A load reduction capability factor of one or more batteries is determined with a real-time controller, the load reduction capability factor corresponding to an amount of energy required to fulfill a load reduction corresponding to at least one of the demand response rewards. The net energy demand is compared with the demand threshold to determine a demand difference with the real-time controller. Battery charge levels of the one or more batteries are controlled with the real time controller according to the demand difference and the load reduction capability factor.

According to another aspect of the present principles, a behind the meter energy management system is provided for controlling battery charge levels to maximize power demand savings. The system includes a power demand management controller that predicts a demand charge threshold based on historical load to reduce peak demand charges. A short-term forecaster predicts a net energy demand for a current day. A rolling time horizon optimizer determines a demand threshold for maximizing financial savings using the net energy demand by concurrently optimizing the savings associated with both the demand charge rates and the time-of-use rates, and the demand response rewards. A real-time controller controls battery charge levels, controlling the battery charge levels including, determining a load reduction capability factor of one or more batteries, the load reduction capability factor corresponding to an amount of energy required to fulfill a load reduction corresponding to at least one of the demand response rewards, comparing the net energy demand with the demand threshold to determine a demand difference, and controlling battery charge levels of the one or more batteries according to the demand difference and the load reduction capability factor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
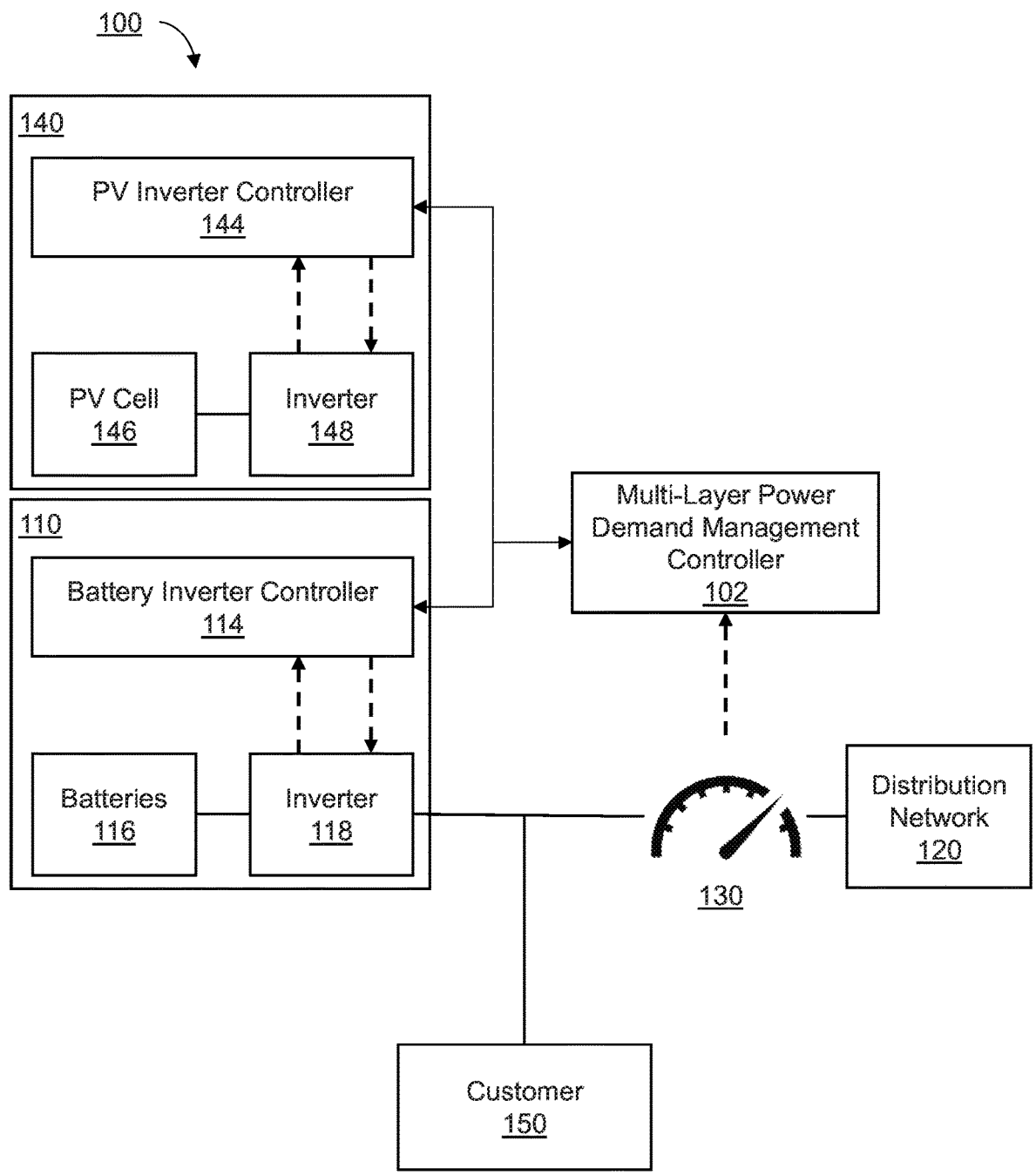
FIG. 1 is a block/flow diagram illustrating a high-level system/method for demand charge and demand response management using energy storage, in accordance with the present principles.

In accordance with the present principles, systems and methods are provided for behind the meter energy management that concurrently optimizes demand charge reductions, time-of-use charge reductions and demand response rewards maximization to maximize financial savings.

In one embodiment, a behind the meter energy management system (BTM-EMS) monitors and balances the demand of power from a grid, batteries and renewable energy sources, among other sources of energy. The BTM-EMS takes into account each of the demand charge, renewable energy utilization, time-of-use, and demand response as dynamic factors for determining an optimum battery usage decision.

According to historical power usage and renewable energy source utilization, demand charge thresholds (DCTs) are calculated on, e.g., a monthly basis. The DCTs can take into account both demand charges as well as time-of-use charges according to power demanded from the grid. Accordingly, a net grid power demand is determined for a set of previous months in each of the off-peak, partial peak, and peak time periods throughout the corresponding months. According to the historical data, an optimal DCT can be predicted for a coming month that incorporates an off-peak DCT, partial-peak DCT and peak DCT.

A daily control layer can then be used for day-ahead forecasts of power demand and renewable energy utilization according to historical data. A rolling-time horizon optimizer can use the day-ahead forecasts as well as the DCTs to optimize a balance of power use from the grid, batteries and renewables according to a minimization of costs and available power in the batteries. To further increase savings, the optimization can take into account possible demand response rewards such as, e.g., peak pricing types of demand response rewards and load reduction types of demand response rewards, as well as others. The demand response rewards can be optimized concurrently with the demand charge and time-of-use charges to reduce maximize overall savings, even where demand charge goals compete with demand response goals.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for demand charge and demand response management using energy storage is illustratively depicted in accordance with one embodiment of the present principles.

In one embodiment, the multi-layer adaptive demand charge management control includes a behind the meter energy management system (BTM-EMS) 100. As the customer 150 draws power from the distribution network 120, a meter 130 monitors the customer's 150 power demand. The BTM-EMS 100 may, therefore, be configured to detect the power demand with the meter 130, and control charging and discharging of batteries 116 to manage power transactions with the distribution network 120.

Additionally, some customers 150 can utilize behind the meter renewable energy sources 140, such as, e.g., photovoltaic (PV) cells 146, to supplement grid power by providing energy to the batteries 116 via the battery inverter controller 114. Thus, to better control the batteries 116, the multi-layer power demand management controller 102 can monitor PV cell 146 utilization by tracking power supplied from the PV cell 146 to the PV inverter controller 144 via the inverter 148, and directed towards the batteries 110.

The BTM-EMS 100 may control the batteries 116 using the multi-layer power demand management controller 102. According to one aspect of the invention, the multi-layer demand charge management controller 102 may include two or more layers of optimizing a demand charge threshold (DCT). The DCT may be used by the BTM-EMS 100 to determine at what point, and to what extent, the power demand by the customer should be supplemented with power from the batteries 116 and PV cells 146. According to an aspect of the invention, the two or more layers may include, for example, a monthly layer and a daily layer, however other layers could be used (e.g. yearly, seasonally, weekly, hourly, etc.).

The two or more layers of the multi-layer power demand management controller 102 ensure that the DCT is optimized with minimal error by forecasting an optimal DCT over a relatively long period using a first layer (for example, a billing period such as a month). The forecasted DCT may then be further optimized using at least one subsequent layer that adjusts the DCT based on a relatively shorter period forecast of power demand to address unpredicted power demand changes. Each layer of the multi-layer power demand management controller 102 may include data driven determinations according to past behavior. For example, the forecasted DCT in the first layer may be determined according historical data of either the customer's 150 power demand history, or the power demand history of other customers if the instant customer 150 does not have sufficient power demand history for an accurate forecast.

To further increase savings, the forecasted DCT can be split into more than one DCT corresponding to multiple times-of-use of demanded power at the meter 130. For example, the distribution network 120 may charge different rates for different times, e.g., different times of day, week, month, or other period. One example includes a distribution network 120 that charges according to off-peak, partial peak and peak periods of each day. Accordingly, to achieve an accurate prediction of demand charges in the coming billing period can be forecasted for each of the off-peak, partial peak and peak portions of each day. Accordingly, the forecasted DCT includes time-of-use variation in charges by including three component DCTs, an off-peak DCT, a partial peak DCT and peak DCT.

Upon determining an optimum DCT, the multi-layer power demand management controller 102 may perform real-time battery control using an inverter controller 104 to control an inverter 108. The inverter controller 104 may control the inverter 108 according to the DCT optimized by the multi-layer power demand management controller 102 to discharge the batteries 106 when power demand rises above the DCT, thus supplementing power demanded from the distribution network 120.

Accordingly, the BTM-EMS 100 may reduce demand peaks in the case that demand rises above a certain DCT value. Because customers are charged based on energy consumed and peak power demand in a billing period (a billing period often being a month), peak power demand can result in up to 50% of a customer's power bill. As a result, the reduction in power demand peaks stands to significantly reduce a customer's power charges by reducing demand charges. The use of a demand charge management controller having multiple layers 102, error can be minimized. For example, underestimation of DCT can be prevented. By preventing underestimation of the DCT, the BTM-EMS 100 can prevent unnecessary charging and discharging of the batteries 106, and thereby reducing degradation of the batteries 106, therefore increasing the lifespan of the batteries 106.

However, according to aspects of the present invention, reducing power demand peaks can inhibit demand response. Some distribution networks 120 provide financial rewards for decreasing power demand to below a firm service level (FSL) using demand response at particular times to stabilize total grid power draw, such as, e.g., scheduled load reduction programs (SLRP), base interruptible program (BIP) and peak time rebate (PTR), among others. However, demand response rewards might not be available if the response requires a demand reduction at times that do not line up with the forecasted DRT, resulting in insufficient battery power to accommodate the load reduction. As a result, the multi-layer power demand management controller 102 can include forecasting DCTs by incorporating demand response programs and associated FSLs, along with time-of-use as described above. As a result, the multi-layer power demand management controller 102 can optimize the use of batteries 110 and renewable sources 140 together with demand charges, demand response rewards, and time-of-use charges to minimize costs overall.

Figure 2:
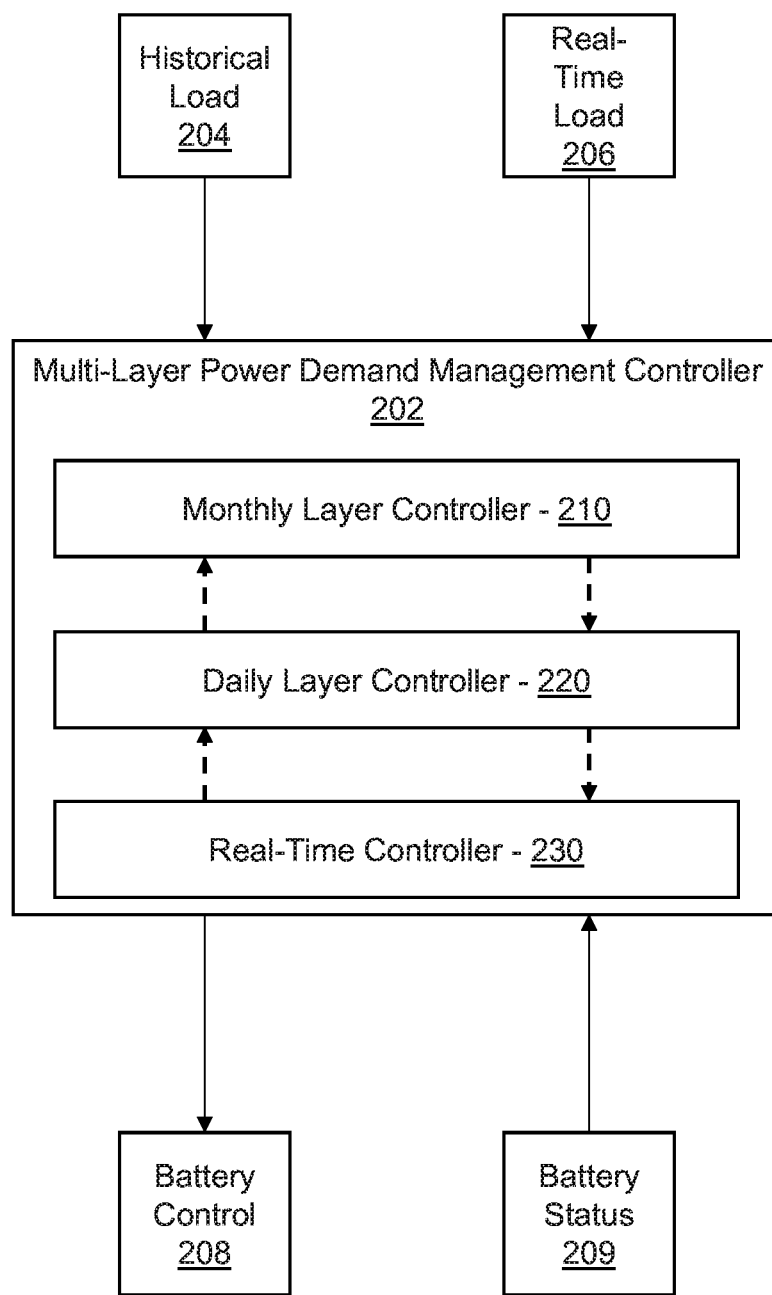
FIG. 2 is a block/flow diagram illustrating a system/method for a multilayer power demand management controller, in accordance with the present principles.

Referring now to FIG. 2, a system/method for a multilayer power demand management controller is illustratively depicted in accordance with one embodiment of the present principles.

According to an aspect of the present invention, a multi-layer power demand management controller 202 may be used. The multi-layer power demand management controller 202 takes into account a historical load 204 and real-time load 206 to control battery utilization using battery control 208 and battery status 209 information. The multi-layer power demand management controller 202 can include a monthly layer controller 210, a daily layer controller 220 and real-time battery storage controller 230.

The monthly layer controller 210 uses the historical load 204, including total demanded power, to predict an initial DCT for a coming month. To generate the initial DCT, the monthly layer controller 210 can analyze trends in historical data, such as a plurality of DCT profiles corresponding to the historical load 104, each profile including a profile of DCTs for a corresponding month, e.g., over the past year, or other period of months.

A given DCT profile can include the optimum DCT for each day of the month. However, a DCT profile can also include the optimum DCT for each period of each day of the month. For example, the DCT profile can include an off-peak DCT profile corresponding to the optimum DCT of the off-peak portion of each day of the month, as well as partial peak DCT profile and peak DCT profile corresponding to partial peak and peak portions of each day, respectively. Accordingly, an optimum initial DCT profile for the coming month is predicted.

The initial DCT profile is provided to the daily layer controller 220. The initial DCT value can then be adjusted by the daily layer controller 220 to ensure an accurate DCT value for a coming day. Using recent load data, the daily layer controller 220 can forecast a load for the coming day by employing, e.g., a machine learning model such as, e.g., an auto-regressive integrated moving average (ARIMA) model to forecast the load for the coming day. The daily layer controller 220 can perform the forecast for each portion of the coming day, including, e.g., off-peak times of the day, partial peak and peak.

As a result, the short-term forecast for the next day can provide a more precise prediction of the load for the coming day. However, to incorporate the forecasted load into a monthly demand charge and time-of-use charge reduction, the forecasted load can be used to modify the initial DCT value to generate a modified DCT. The forecasted load and the battery state of charge (SOC) are used to calculate an adjustment value for each time-of-use period of the coming day. The adjustment value decreases the initial DCT to match decreased load forecasts to compensate for overestimation of the initial DCT. As a result, the modified DCT can facilitate lower demand charges, while preserving demand response throughout the month. Accordingly, the initial DCT value provides a long-term optimization of the DCT in light of demand response programs, while the daily layer controller 220 adjusts the initial DCT to decrease the DCT for a coming day when possible. As a result, savings are increased by achieving a minimum demand peak while preventing unnecessary battery degradation.

The modified DCT value will be retrieved by a real-time battery storage controller 230. The real-time battery storage controller 230 may be, for example, a processor. The real-time battery storage controller 230 uses the modified DCT value along with the SOC and battery specifications to make a determination as to whether to charge or discharge the batteries, or to take no action. The real-time battery storage controller 230 may then update the SOC and report the SOC to the daily layer controller 220.

The multi-layer demand charge management controller 202, therefore, controls batteries of a BTM-EMS to only charge or discharge the batteries in a way that achieves an optimum balance between demand peak shaving across multiple time-of-use periods and demand response programs, thus reducing costs. Also, since the proposed demand charge and response management solution starts each month with an initial estimation of a DCT value, it may prevent unnecessary battery charge and discharge cycles and may minimize battery degradation which may lead to maintenance cost reduction.

Figure 3:
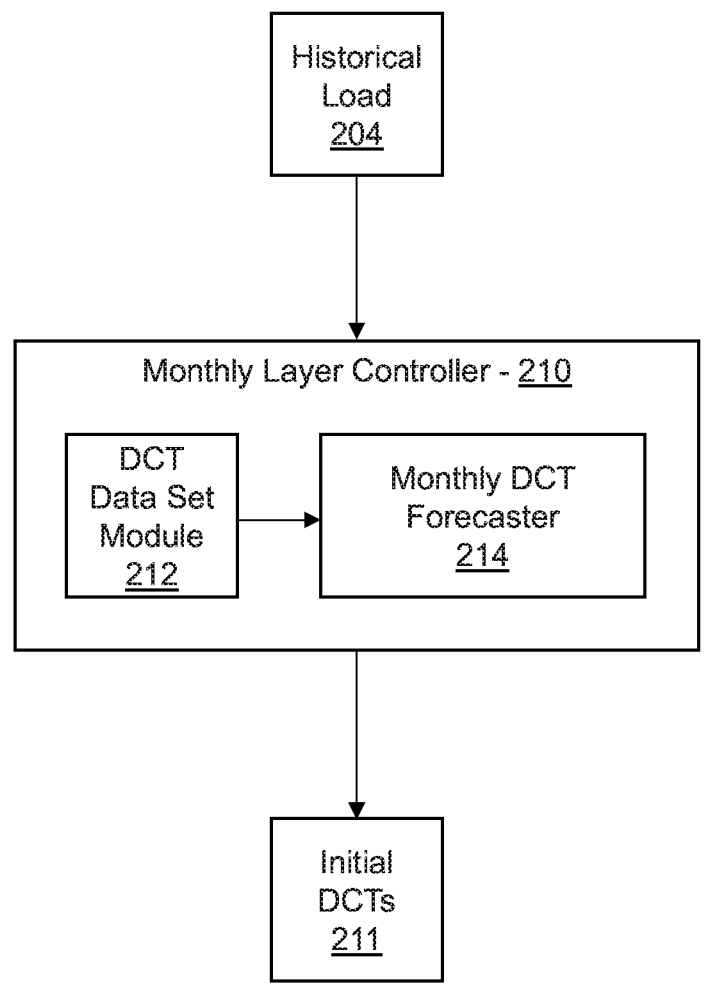
FIG. 3 is a block/flow diagram illustrating a system/method for a monthly layer for the forecasting of power demand for multi-layer power demand management, in accordance with the present principles.

Referring now to FIG. 3, a system/method for a monthly layer for the forecasting of power demand for multi-layer power demand management is illustratively depicted in accordance with one embodiment of the present principles.

The monthly layer controller 210 may include a DCT data set module 212. The DCT data set module 212 may include, for example, a computer memory or a buffer for storing a DCT data set, demand response FSLs and time-of-use rates. The DCT set may include historical data of load profiles, DCT values, demand charge tariff rates and battery specifications, or the DCT set may be preprocessed to include a set of relevant DCT profiles based on the historical data.

Using the DCT data set from the DCT data set module 212, the monthly layer controller 210 forecasts a DCT value for the coming month using a monthly DCT forecaster 214. The monthly DCT forecaster 214 may be, for example, a computer processor. The monthly DCT forecaster 214 may utilize the DCT data set provided by the DCT data set module 212 to determine trends in historical data such as a plurality of DCT profiles including multiple months of DCT values. The DCT forecaster 214 can compare the plurality of DCT profiles to a current DCT profile to determine trends for predicting an initial DCT value for the coming month.

In particular, the monthly DCT forecaster 214 of the multi-layer demand charge management controller forecasts an initial DCT value for a coming month, using trends in historical monthly DCT values, historical load profiles, demand charge tariff rates, time-of-use tariff rates and battery specifications.

At the end of a most recent month, the monthly DCT forecaster 214 can first calculate the optimal DCT for that month given the load profile, the demand charge tariff rates and the battery specifications for that month. The optimal DCT may calculated according to the following optimization problem:

$$\min_{P_b} DCT = \max_t P_g(t) \qquad \text{Equation 1}$$

$$\text{s.t.} \quad SOC^{min} \leq SOC(t) \leq SOC^{max} \; \forall \, t \in \{1 \ldots n\}$$

$$P_b^{min} \leq P_b(t) \leq P_b^{max} \; \forall \, t \in \{1 \ldots n\}$$

$$P_g(t) + P_b(t) = P_d(t) \; \forall \, t \in \{1 \ldots n\}$$

$$SOC(t) = SOC(t-1) + P_d(t-1)\Delta t \; \forall \, t \in \{1 \ldots n\}$$

where DCT includes a component for each time-of-use rate including off-peak, partial peak and peak, t is the time step counter, n is the total number of the time steps in the whole billing period and $\Delta t$ is the duration of each time step (i.e. 15 minutes), $P_g(t)$ and $P_b(t)$ are the active powers provided by grid and battery discharge respectively to provide active power demand by load $P_d(t)$ at the time t, $SOC^{min}$ and $SOC^{max}$ are minimum and maximum allowed boundaries for the battery state of the charge and $SOC(t)$ is the battery state of charge at time t, and $P_b^{min}$ and $P_b^{max}$ define battery power limits.

The monthly DCT forecaster 214 generates a reference DCT profile ($DCT_{ref}$) from the optimal DCT values calculated for each month in a period of operation of the battery system, wherein the period of operation may span a particular number of months P, including the most recent month. The $DCT_{ref}$ may comprise a time series including the calculated optimal DCT value for each month in the period of operation P. Each optimal DCT value may have been previously calculated in a manner similar to equation 1 above.

The monthly DCT forecaster 214 selects all DCT profiles having a same period of operation including P months as the $DCT_{ref}$ period of operation. For example, if the period length P is one year, or twelve months, and the period of operation started in January and ended in December, The monthly DCT forecaster 214 selects each DCT profile having DCT values for a series of 12 months spanning from January to December. All of these P-length DCT profiles are loaded into a DCT search set ($DCT_{sch}$).

The monthly DCT forecaster 214 then performs a normalization on the $DCT_{ref}$ ($\overline{DCT}_{ref}$) time series as well as each DCT series in the $DCT_{sch}$ ($\overline{DCT}_{sch}$) set. The normalization of the DCT profiles may be based on, for example, the average value of each DCT profile. The normalization step ensures that all DCT profiles are in the same scale of variation. By normalizing all of the DCT profiles, the monthly layer 300 can more effectively determine similarity between $DCT_{ref}$ and each DCT profile included in $DCT_{sch}$.

The monthly DCT forecaster 214 determines the similarity between $\overline{DCT}_{ref}$ and each DCT profile in $\overline{DCT}_{sch}$. Determining similarity may include, for example, calculating the Euclidean distance between $\overline{DCT}_{ref}$ and each DCT profile in $\overline{DCT}_{sch}$. However, other methods of determining similarity may be used, such as by calculating a Mikowski distance or a Pearson correlation coefficient.

The monthly DCT forecaster 214 selects a set of all similar DCT profiles among the DCT profiles in $\overline{DCT}_{sch}$. The similarity is based, for example, on the calculated Euclidean distance between $\overline{DCT}_{ref}$ and each DCT profile in $\overline{DCT}_{sch}$ and a predetermined distance threshold. The predetermine distance threshold may be a value of the greatest distance for a profile to be deemed similar. The normalized DCT profiles that are determined to be similar are grouped into a DCT similar set ($\overline{DCT}^s$) that can be used to forecast an initial DCT value for a coming month.

The monthly DCT forecaster 214 forecasts a normalized DCT for the coming month $\overline{DCT}_{t+1}$ based on $\overline{DCT}^s$ and a normalized DCT value from a month 11 months prior $\overline{DCT}_{t-11}$. For example, forecasting a DCT value for February of one year will include taking into account $\overline{DCT}^s$ and the normalized DCT value for February of the previous year. The forecasting may include calculating a forecasting equation such as equation 2 below:

$$\overline{DCT}_{t+1} = \frac{1}{M+1}\left[\overline{DCT}_{t-11} + \sum_{i=1}^{M} \overline{DCT}_i^s\right] \quad \text{Equation 2}$$

where M is the number of profiles $\overline{DCT}^s$.

If $\overline{DCT}^s$ includes the DCT profile from the previous year, equation 2 may be adjusted to increase the weight of $\overline{DCT}_{t-11}$ in order to account for seasonality in power loads. For example, the monthly DCT forecaster 214 can adjust equation 2 as shown below in equation 3:

$$\overline{DCT}_{t+1} = \frac{1}{2M-2}\left[(M-2) \times \overline{DCT}_{t-11} + \sum_{i=1}^{M} \overline{DCT}_i^s\right] \quad \text{Equation 3}$$

The monthly DCT forecaster 214 then denormalizes $\overline{DCT}_{t+1}$ to generate an initial DCT value for the coming month.

Figure 4:
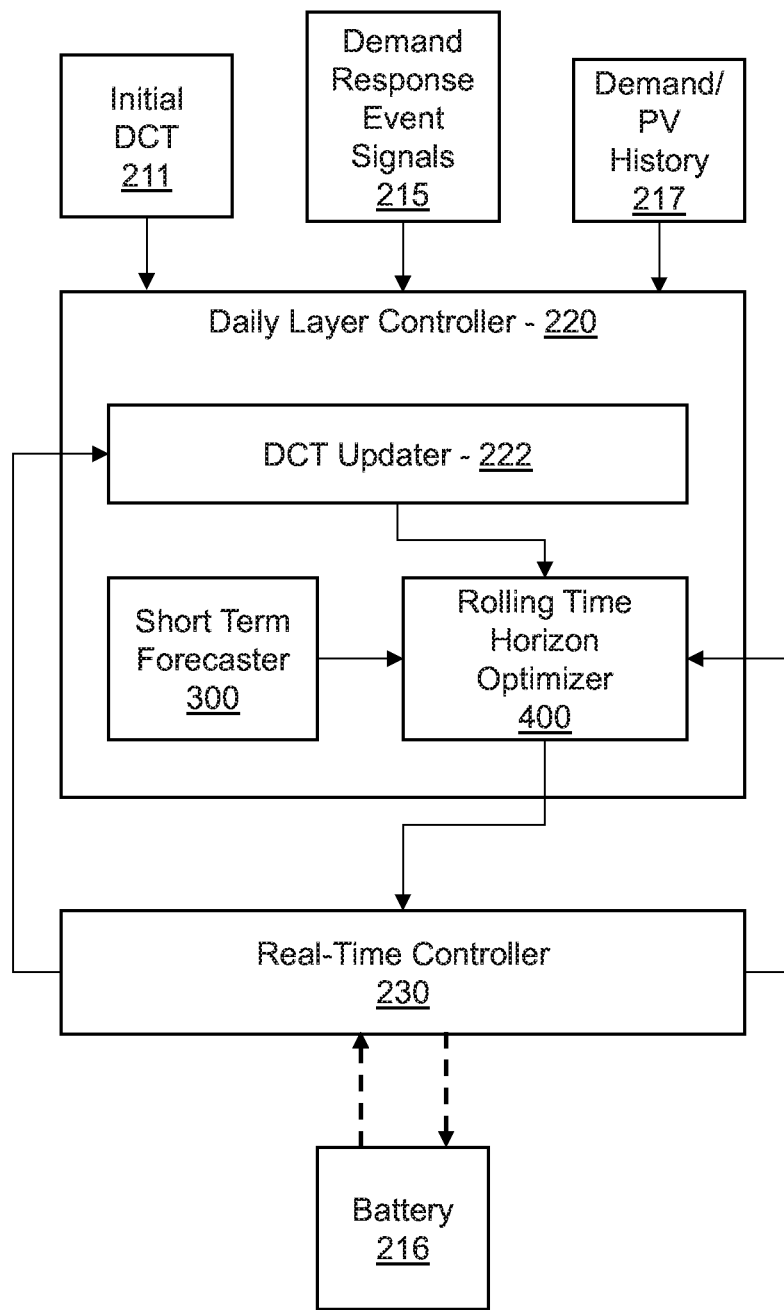
FIG. 4 is a block/flow diagram illustrating a system/method for a daily layer for the forecasting of power demand for multi-layer power demand management, in accordance with the present principles.

Referring now to FIG. 4, a system/method for a daily layer for the forecasting of power demand for multi-layer power demand management is illustratively depicted in accordance with one embodiment of the present principles.

The initial DCT value may then be adjusted by the daily layer controller 220 to ensure an accurate DCT value for a coming day by updating the initial DCT 211 with a DCT updater 222. The DCT updater 222 takes into account the demand/PV history 217 to reduce overestimation of the initial DCT 211 as described above with reference to FIG. 2. The DCT updater 222 may also perform a data cleansing operation to remove abnormal past load patterns from the data set, such as holidays.

In particular, the initial DCT 211 along with the demand/PV history 217 and a battery state of charge (SOC) reported by the real-time controller 230 can be used to adjust the initial DCT value to compensate for overestimations. For example, the DCT updater 22 can optimize an adjustment value that is the minimum achievable increase to the initial DCT 211 value that will achieve a minimum demand peak while preventing unnecessary battery degradation. The adjustment value can, therefore, modify the initial DCT 211 to compensate for error in the initial DCT value due to load irregularities as a result of factors such as weather or holidays.

The daily layer controller 220 can also perform short-term load forecasting using a short-term load forecaster 300. The short-term load forecaster 300 may be, for example, a processor. The short-term load forecaster 300 can forecast load for the next day by retrieving load data for a given period, such as load profiles including demand behavior for each day over the past four weeks as well as renewable energy utilization such as, e.g, PV cell utilization. Using the load data and PV utilization data, the short-term load forecaster 300 can use machine learning, such as, e.g., a model stored in a memory, to predict the load for the next day. For example, the short-term load forecaster 222 may use a time series model, such as an auto-regressive integrated moving average (ARIMA) model to forecast the net load for the coming day, where the net load is the load demanded from the grid minus the PV energy available.

The modified DCT and the predicted net load can be retrieved by a rolling time horizon optimizer 400 that determines an optimum demand reduction schedule for the coming day. The rolling time horizon optimizer 400 may be, for example, a processor. The optimum demand reduction schedule can depend on PV utilization, demand charge tariffs, time-of-use rates and demand response rewards, among other factors.

The daily layer controller 220 performs short-term load forecasting using a short-term load forecaster 300. The short-term load forecaster 300 may be, for example, a processor. The short-term load forecaster 300 can forecast load for the next day by retrieving load data for a given period, such as load profiles including demand behavior for each day over the past four weeks. Using the load data, the short-term load forecaster 222 may use machine learning to predict the load for the next day. For example, the short-term load forecaster 222 may use a time series model, such as an auto-regressive integrated moving average (ARIMA) model to forecast the load for the coming day.

In particular, the rolling time horizon optimizer 400 can perform optimization by determining the optimum DCTs according to teach time-of-use rate in the coming day can calculating savings according to the demand charge costs for each time-of-use rate, determine reward amounts according to available demand response programs, and optimizing the combination of savings and rewards to increase total amount saved over both demand charge reduction and demand response rewards.

Using the short-term load forecast, as well as the modified DCT and demand response event signals 215, the rolling time horizon optimizer 400 can determine the optimum DCTs to reduce demand charges. However, the grid operator may have demand reduction rewards for responding to demand response programs. Thus, savings can be increased by reducing demand during the demand response program times. However, the demand response programs may run counter to some goals of the demand charge reduction, such as, e.g., altering battery charging schedules such that the batteries are not charged enough to respond to the DCT or FSL. To prevent these conflicts between optimizing the DCT and the demand response (DR) individually, the rolling time horizon optimizer 400 optimizers both costs savings due to demand charges and rewards due to demand response together. Thus, a financial framework focused on optimizing for savings maximizes the money saved due to both demand charge reduction and demand response rewards, e.g., as shown in equation 4 below:

$$\max_{P_B, DCT, D} (SAV_{DC} + REW_{DR}),\qquad\text{Equation 4}$$

Where $P_B$ is power drawn from the batteries, DCT is the modified DCT, D is a demand threshold, $SAV_{DC}$ is the savings due to demand charge reduction, and $REW_{DR}$ is the rewards due to demand response programs.

To accurately optimize the modified DCT, the modified DCT is further augmented to take into account demand response reward programs to form the demand threshold D. The demand response rewards can include a FSL, where demand above the FSL can either disqualify a customer for a reward, and/or penalize the customer for the overage. Thus, the modified DCT can be characterized as a demand threshold D where the D is the modified DCT when the FSL is greater than the DCT, otherwise the D is set as the FSL. Therefore, the rolling time horizon optimizer 400 prevents power demanded from the grid from going over the FSL while also minimizing costs according to the modified DCT.

The modified DCT value will be retrieved by a real-time battery storage controller 230. The real-time battery storage controller 230 may be, for example, a processor. The real-time battery storage controller 230 uses the modified DCT value along with the SOC and battery specifications to make a determination as to whether to charge or discharge the batteries, or to take no action. The real-time battery storage controller 230 may then update the SOC and report the SOC to rolling time horizon optimizer 400 for later DCT optimization.

Figure 5:
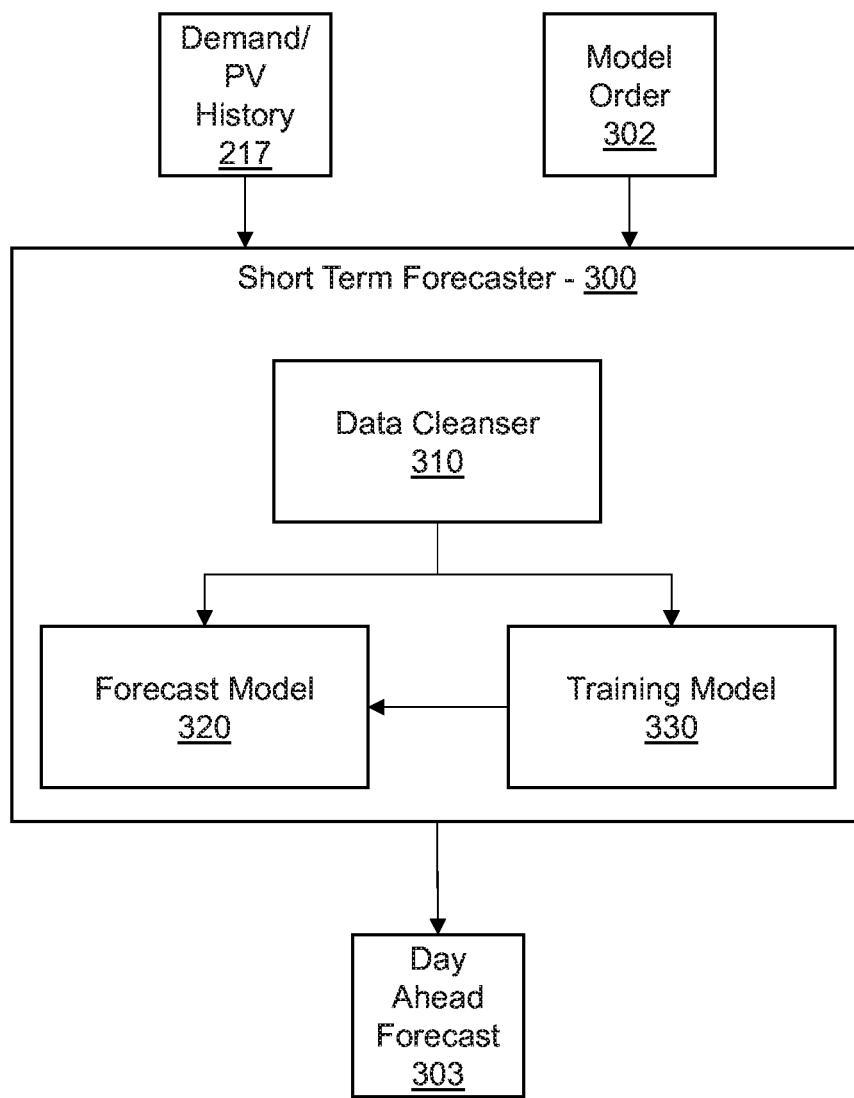
FIG. 5 is a block/flow diagram illustrating a system/method for short-term forecasting of power demand in a multi-layer power demand management controller, in accordance with the present principles.

Referring now to FIG. 5, a system/method for short-term forecasting of power demand in a multi-layer power demand management controller is illustratively depicted in accordance with one embodiment of the present principles.

The daily layer controller 220 can facilitate optimization of cost savings by determining a more accurate load for a coming day using the short-term forecaster 300. To improve accuracy, the short-term forecaster 300 can include a data cleanser 310. The data cleanser 310 analyzes the demand/PV history 217 and, e.g., removes abnormal data points and outliers, such as, e.g., data for holidays, unusual weather, or other abnormal condition affecting power demand.

Using the cleansed history, the short-term forecaster 300 trains a model, such as, e.g., an ARIMA model or a seasonal ARIMA (SARIMA) model to learn power demand behaviors with the training model 330. The training model 330 can be provided with a new cleansed history every, e.g., day to update the model. Thus, every new day utilizes an updated training model 330 for forecasting the load for the coming day to update the model parameters (e.g. the coefficients of the seasonal ARIMA model).

In order to account for seasonality, a separate model is trained for each day of the week. For example, if the current time is the beginning of Monday, the seasonal ARIMA model is trained using previous Mondays load profiles. Therefore, the ARIMA model will be trained only with past load profiles for the same day of the week as is being forecasted. The model order 302 of the ARIMA model can be determined using auto-correlation and partial auto-correlation tests, or otherwise provided to the short-term forecaster 300 for use by the training model 330.

The model learned by the training model 330 can then be provided to the forecast model 320. The forecast model 320 implements the trained model to provide, e.g., a 24-hour ahead forecast of load. Thus, at the beginning of a day, the forecast model 320 receives the updated trained model from the training model 330 and uses the trained model throughout the day to regularly forecast 24 hours ahead, until the beginning of the next day, when a newly updated trained model is produced. To provide a constant day-ahead forecast 303 of the load, the forecast model 320 can be re-initiated periodically, e.g., every 15 minutes. Thus, the daily layer controller 220 can maintain a substantially constant day ahead forecast 303 for optimization of the DCT and power use and allocation for increased savings and efficiency.

Figure 6:
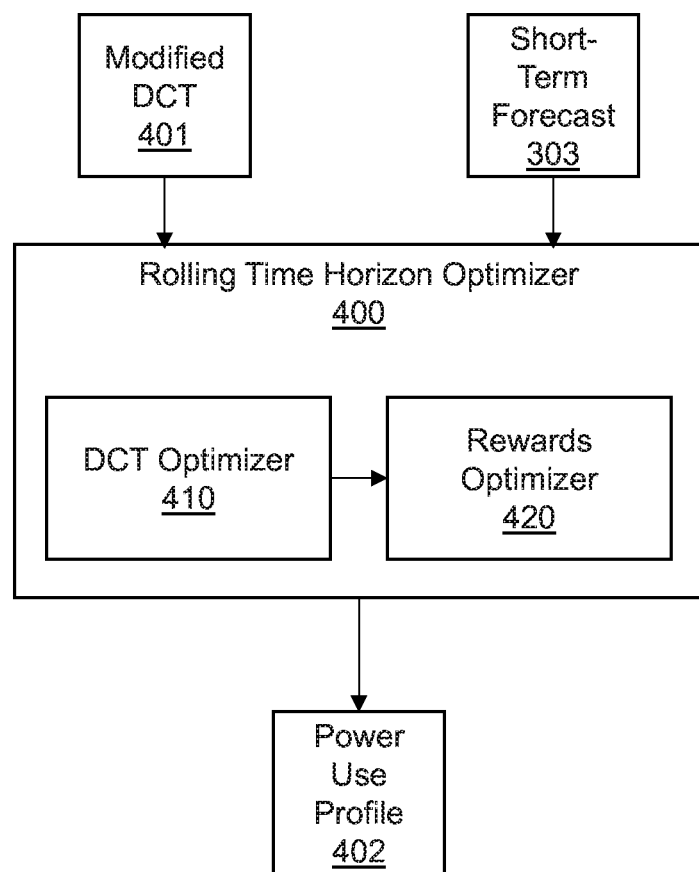
FIG. 6 is a block/flow diagram illustrating a system/method for rolling time horizon optimization with a DCT optimizer and a rewards optimizer, in accordance with the present principles.

Referring now to FIG. 6, a system/method for rolling time horizon optimization with a DCT optimizer and a rewards optimizer is illustratively depicted in accordance with one embodiment of the present invention.

The rolling time horizon optimizer 400 uses the modified DCT 401 and day-ahead forecast 303 to optimize a power use profile 402 for maximizing savings. According to aspects of the present embodiment, the rolling time horizon optimizer 400 can include modules such as a DCT optimizer 410 to optimize the DCT values, and rewards optimizer 420 to concurrently optimize the savings and the rewards related to demand charges and demand response programs, respectively.

Demand charge rates can vary depending on time of day. Thus, the time-of-use of power demand effects the demand charges for power demand. Similarly, demand response programs can also effect demand charges. As a result, optimization of the DCT can take into account the effects of the demand response programs and time-of-use to improve cost savings with appropriately optimized DCTs, including off-peak, partial peak and peak DCTs. Accordingly, the costs associated with DCTs can be determined by, e.g., equation 5 below:

$$(C_{off}(DR)\Delta DCT_{off} + C_{par}(DR)\Delta DCT_{par} + C_{peak}(DR)\Delta DCT_{peak}),\qquad\text{Equation 5}$$

where $C_{off}$, $C_{par}$ and $C_{peak}$ are the demand charge tariff costs for off-peak, partial peak and peak times, respectively, $\Delta DCT_{off}$, $\Delta DCT_{par}$ and $\Delta DCT_{peak}$ are changes to the off-peak, partial peak and peak DCT values, respectively, and DR is a demand response event signal. Accordingly, a cost of a set of changes to the modified DCT values can be determined according to the changes, the demand response signal and the time-of-use rates.

However, costs are also balanced with power sold back, currently applicable time-of-use and demand response rates, and battery state of charge. Time-of-use at a current time can be characterized as TOU(DR, t)$P_G$(t), where TOU refers to time-of-use as it depends on demand response signals DR and time t, and $P_G$(t) is the power demanded from the grid at time t. Selling power back to the grid by, e.g., PV utilization, can be characterized as $\gamma P_{sell}$(t), where $P_{sell}$(t) is the power sold to the grid at time t, and $\gamma$ is the penalty associated with injecting power back into the grid. Battery state of charge can be taken into account with $\beta SOC(t)$, where $\beta$ is coefficient for weighting SOC maximization and SOC(t) is the battery state of charge at time t. Each of these functions can be used to optimize the change to the DCT to minimize costs as balanced with battery SOC, time-of-use and PV utilization using, e.g., equation 6 below:

$$\min_{P_B}\Big\{(C_{off}(DC)\Delta DCT_{off} + C_{par}(DC)\Delta DCT_{par} +\qquad\text{Equation 6}$$

-continued $$C_{peak}(DC)\Delta DCT_{peak}) + \sum_{t_0}^{T+t_0}(TOU(DR,T)P_G(t)) +$$
$$\sum_{t_0}^{T+t_0}(\gamma P_{sell}(t)) + \sum_{t_0}^{T+t_0}(\beta SOC(t))\bigg\}.$$

However, as described above, to accurately represent savings, rewards due to demand response programs can be taken into account, such as with equation 4 above. As such, the rolling time horizon optimizer 400 includes the optimization of both savings due to demand charges determined from the optimized DCT changes of equation 6 above, and rewards due to demand response programs using the rewards optimizer 420.

The rewards optimizer 420 can take into account variety of rewards programs to determine rewards, such as, e.g., peak pricing demand response, scheduled load reduction programs, base interruptible programs, and peak time rebates, among others. For example, rewards in a peak pricing program, $REW_{pp}$, can be modeled by equation 7 below:

$$REW_{pp} = \sum_{t_0}^{T+t_0}(C_{peak}(D(t) - P_G(t))),\quad\text{Equation 7}$$

where $C_{peak}$ is the cost associated with demand during peak pricing periods, D(t) is the forecasted demand at time t, and $P_G(t)$ is the grid demand at time t.

Rewards from a scheduled load reduction program, $REW_{slrp}$, can be modeled by equation 8 below:

$$REW_{slrp} = \sum_{t_0}^{T+t_0}(r_{inc}(D_B(t) - P_G(t))),\quad\text{Equation 8}$$

where $r_{inc}$ is a rate incentive for reducing demand below a baseline demand at time t, $D_B(t)$, set by the grid operator, where $r_{inc}$ is zero when grid power is greater than an FSL.

Rewards from a base interruptible program, $REW_{bip}$, can be modeled by equation 9 below:

$$REW_{bip} = \sum_{t_0}^{T+t_0}(r_{inc}(D_B(t) - P_G(t)) - C_{pen}(P_G(t) - FSL(t))),\quad\text{Equation 9}$$

where $C_{pen}$ is the penalty associated with grid power $P_G$ exceeding the firm service level FSL at time t as set by the operator, where $C_{pen}$ is zero when the FSL is greater than the grid power.

Rewards from a peak time rebate program, $REW_{ptr}$, can be modeled by equation 10 below:

$$REW_{ptr} = \sum_{t_0}^{T+t_0}(r_{inc}(D_B(t) - P_G(t))),\quad\text{Equation 10}$$

where $r_{inc}$ is zero when forecasted power demand $D_B$ is greater than or equal to grid power $P_G$.

Accordingly, total demand response rewards $REW_{DR}$ can be represented by the sum of each of equations 7-10, such as in equation 11 below:

$$REW_{DR} = REW_{pp} + REW_{slrp} + REW_{bip} + REW_{ptr}.\quad\text{Equation 11}$$

As a result, the savings determined by optimizing the DCT according to equation 5 above, and the rewards determined by equation 11 can be used by the rewards optimizer 420 to concurrently optimize savings and rewards to maximize total savings, as per equation 4 above, to generate a threshold profile 402, provided that power from the grid is kept below the demand threshold, and battery SOC is maintained between a maximum and minimum SOC.

Figure 7:
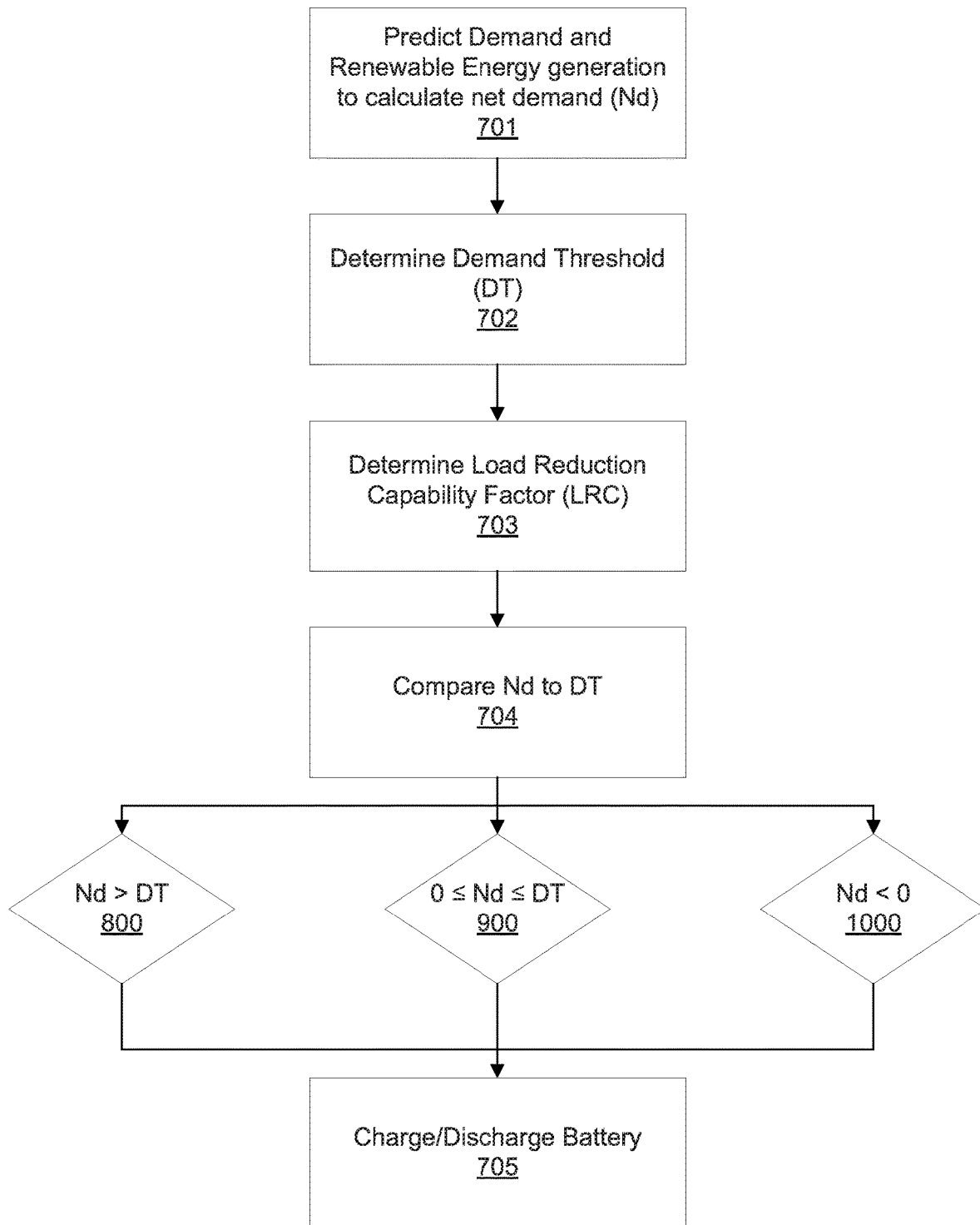
FIG. 7 is a flow diagram illustrating a system/method for controlling battery charge and discharge schedules, in accordance with the present principles.

Referring now to FIG. 7, a system/method for controlling battery charge and discharge schedules is illustratively depicted in accordance with one embodiment of the present principles.

As described above, thresholds from the daily layer controller 220 are provided to the real-time controller 230, including the threshold profile 402. The threshold profile 402 can include the optimized DCT and the FSLs using the overall demand threshold DT. The real-time controller 230 uses the DT to control the batteries to efficiently control charging and discharging of the batteries within the DT.

To accomplish the battery control, as described above, at step 701, a controller such as the daily layer controller 220 can predict demand and renewable energy generation to calculate a net demand Nd demanded from the grid.

At block 702, a power demand management controller, such as the multi-layer power demand management controller 202 described above, including the monthly layer controller 210 and the daily layer controller 220, can then determine an optimum demand threshold DT for a current time period. The DT can be determined using a monthly layer, and then refined and optimized in a daily layer for a short-term forecasted load, as described above. Thus, an optimum DT for maximizing savings can be used that takes into account demand response program rewards.

To properly control batteries, the available energy stored in the batteries is determined and the energy needed to fulfill load reduction to satisfy the DT is determined. The available energy stored in the batteries is the load reduction capability of the system because it is the power available to supplement grid demand. At block 703, a load reduction capability factor (LRC) is determined that compared the load reduction capability with the load reduction requirement according to the DT. The LRC can be calculated as the sum of the different between net demand Nd and the DT across time $$\left(\sum_{t}^{T}(Nd(t) - DT(t))\right).$$

Having determined the DT and the degree to which the battery can supplement energy to accommodate the DT according to the LRC, at block 704 the net demand Nd is compared to the DT. Depending on the relative magnitude of the net demand Nd and the DT, the controller can select a process for determining charge and discharge amounts. For example, the battery is charge or discharged according to process 800 where net demand is greater than the demand threshold. Where net demand Nd is between zero and the demand threshold, process 900 is followed. Where net demand Nd is below zero, process 1000 is followed.

According to the process followed, the battery is charged or discharged at block 705. Accordingly, the battery can be controlled according to the LRC depending on DT requirements.

Figure 8:
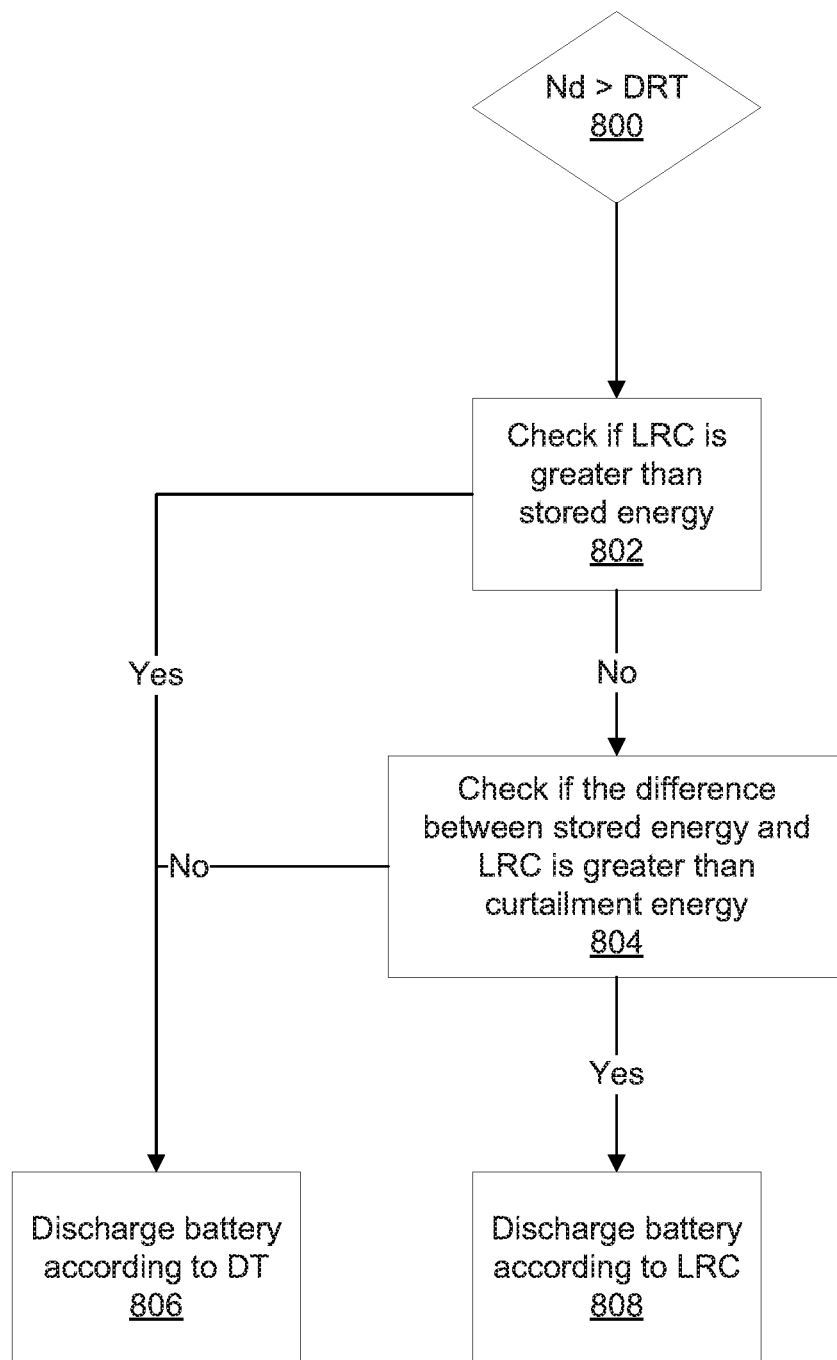
FIG. 8 is a flow diagram illustrating a system/method for controlling battery charging and discharging under a first condition, in accordance with the present principles.

Referring now to FIG. 8, a system/method for controlling battery charging and discharging under a first condition is illustratively depicted in accordance with one embodiment of the present principles.

As described above, a controller can control batteries according to process 800 where net demand Nd is greater than the DT. To do so, at block 802, the LRC is checked for whether the LRC is greater than a stored energy of the battery, such that the stored energy is between a minimum and a maximum SOC of the battery.

If the LRC is greater than the stored energy of the battery, the battery is controlled to discharge, at block 806, according to the DT. For example, the battery can discharge to supplement grid power to provide the difference between the net demand Nd and the DT. Thus, the grid provides power up to the DT, and the battery provides the remainder of the net demanded energy.

If the LRC is less than the stored energy of the battery, a difference between the stored energy and the LRC is compared at block 804 against a curtailment energy that is defined as the different between the net demand Nd and the DT.

If the difference between the stored energy and the LRC is less than or equal to the curtailment energy, the battery is discharged at block 806, as described above. However, if the different between the stored energy and the LRC is greater than the curtailment energy, then the battery is controlled to discharge energy according to block 808. At block 808, the battery is discharged to supplement the net demand according to the different between the stored energy and the LRC. Thus, the battery is controlled such that load reduction capability is not exceeded. A new curtailment energy can then be determined taking into account the power supplemented by discharging the batteries by subtracting the power supplied by the batteries from the net demand.

Figure 9:
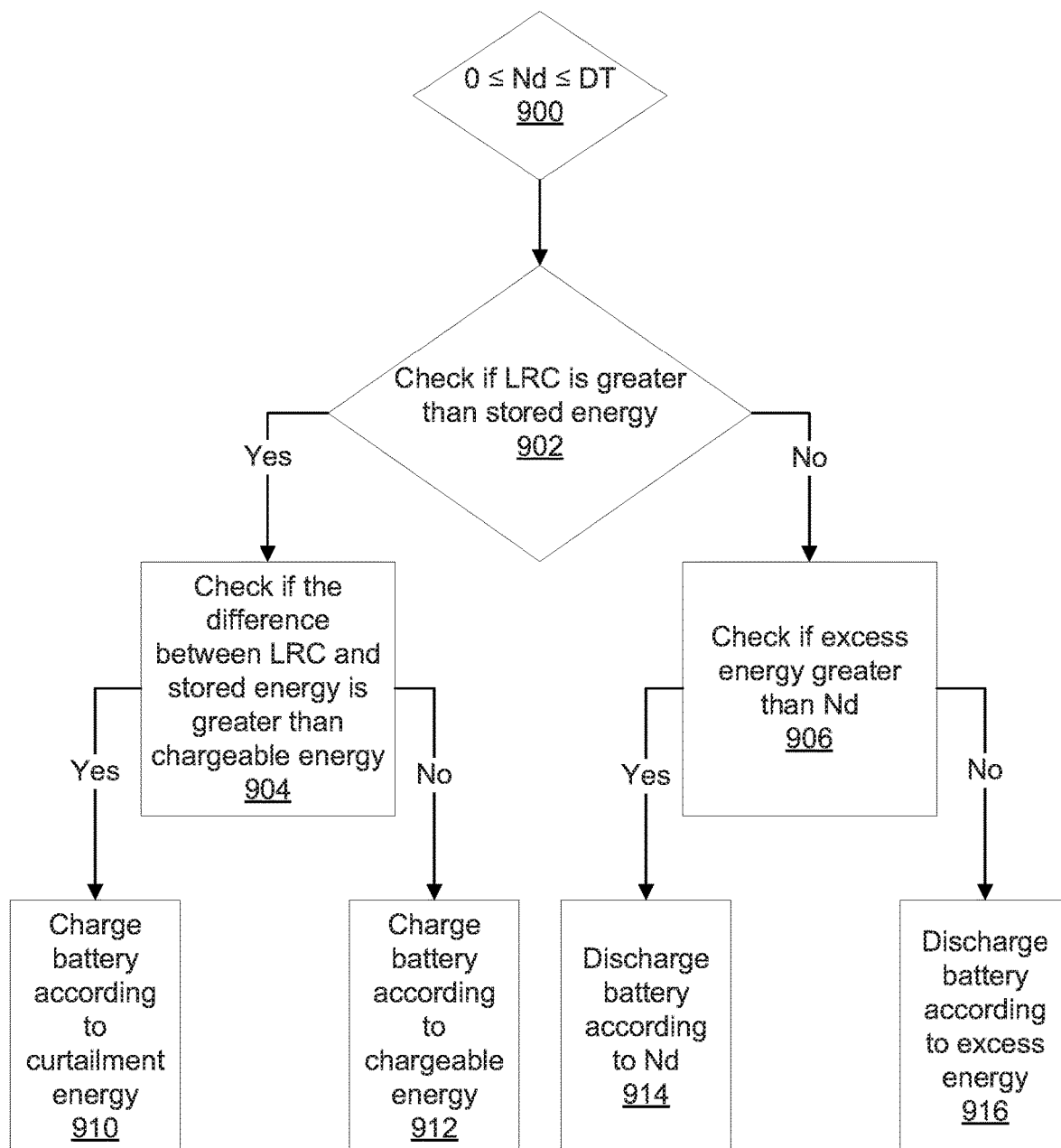
FIG. 9 is a flow diagram illustrating a system/method for controlling battery charging and discharging under a second condition, in accordance with the present principles.

Referring now to FIG. 9, a system/method for controlling battery charging and discharging under a second condition is illustratively depicted in accordance with one embodiment of the present principles.

As described above, a controller can control batteries according to process 900 where net demand Nd is between zero and the DT, where the difference between the net demand Nd and the DT can be used to charge batteries as chargeable energy. To do so, at block 902, the LRC and the stored energy are compared.

If the LRC is greater than the stored energy, then the difference between LRC and the stored energy can be compared to the chargeable energy. If the difference is greater than the chargeable energy, the battery can be controlled to be charged according to the chargeable energy to maximize energy stored in the battery at block 910. However, if the difference is less than the chargeable energy, then the battery can charged according to the difference at block 912 such that the batteries are filled to maximum capacity. Therefore, charging of the batteries are maximized depending on the LRC and an amount of headroom for greater power demand before reaching the DT. Thus, available power demand below the DT is maximized.

However, if the LRC is less than the stored energy, thus resulting in excess energy in the batteries, the excess energy can be compared to the net demand Nd at block 906. Where the excess energy is greater than the net demand Nd, the battery can be controlled to be discharged at block 914 to supplement power demand according to the net demand. Thus, excess energy in the batteries can be leveraged to provide the energy of required for the net demand. However, if the excess energy is less than the net demand Nd, then the battery can be controlled to discharge the excess energy at block 916. Thus, the excess energy can be leveraged to supplement at least a part of the net demand without wasting battery power.

Figure 10:
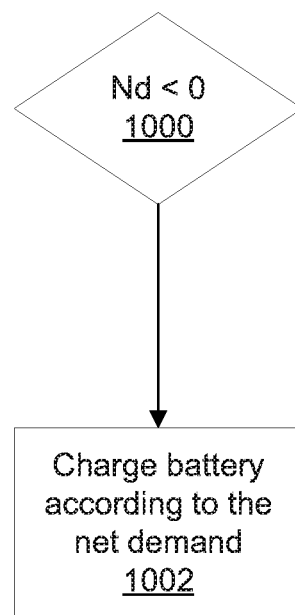
FIG. 10 is a flow diagram illustrating a system/method for controlling battery charging and discharging under a third condition, in accordance with the present principles.

Referring now to FIG. 10, a system/method for controlling battery charging and discharging under a third condition is illustratively depicted in accordance with one embodiment of the present principles.

As described above, a controller can control batteries according to process 1000 where net demand Nd is less than zero. To do so, at block 1002, the battery is controlled to be charged according to the net demand. Therefore, excess power, e.g., from PV cells or other renewables that drive the net demand below zero, can be transferred to the batteries for later use. Accordingly, the excess power is not wasted and long-term costs can be reduced by stored the excess power.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for controlling battery charge levels to maximize power demand savings in a behind the meter energy management system, the method comprising:

predicting a demand charge threshold with a power demand management controller based on historical load to reduce peak demand charges;

predicting a net energy demand for a current day with a short-term forecaster;

determining a demand threshold for maximizing financial savings using the net energy demand using a rolling time horizon optimizer by concurrently optimizing the savings associated with both the demand charge rates and the time-of-use rates, and the demand response rewards;

determining a load reduction capability factor of one or more batteries with a real-time controller, the load reduction capability factor corresponding to an amount of energy required to fulfill a load reduction corresponding to at least one of the demand response rewards;

comparing the net energy demand with the demand threshold to determine a demand difference with the real-time controller; and controlling battery charge levels of the one or more batteries with the real time controller according to the demand difference and the load reduction capability factor.

2. The method as recited in claim 1, wherein predicting the demand charge threshold further includes:
   determining a billing cycle demand charge threshold based on historical loads from past billing cycles with a medium-term layer controller; and
   optimizing the demand charge threshold for a current period shorter than the billing cycle using the real-time load and the renewable energy source utilization with a short-term layer controller.

3. The method as recited in claim 2, wherein the billing cycle is one month.

4. The method as recited in claim 2, wherein the current period is one day.

5. The method as recited in claim 1, further including recording a power load demand, including a real-time load demanded from an energy distribution network and a renewable energy source utilization.

6. The method as recited in claim 1, wherein determining the demand threshold includes:
   determining an optimum demand charge threshold for reducing demand charges; and
   determining firm service levels corresponding to demand response programs issued for a distribution network, wherein the demand threshold is defined by the firm service levels when the optimum demand charge threshold exceeds the firm service levels.

7. The method as recited in claim 1, further including determining demand response rewards by summing rewards and penalties associated with power demanded from the grid compared to firm service levels of demand response programs issued for a distribution network.

8. The method as recited in claim 1, wherein concurrently optimizing the savings includes:
   summing demand charge savings associated with the demand charge threshold with rewards associated with firm service levels of demand response programs issued for a distribution network to produce a total savings; and
   maximizing a reduction in the demand charge threshold according to the total savings.

9. The method as recited in claim 1, further including determining a battery state of charge to prevent discharge the one or more batteries below a minimum state of charge.

10. A method for controlling battery charge levels to maximize power demand savings in a behind the meter energy management system, the method comprising:
    recording a power load demand, including a real-time load demanded from an energy distribution network and a renewable energy source utilization;
    predicting a demand charge threshold with a power demand management controller based on historical load to reduce peak demand charges, the predicting a demand charge threshold including:
      determining a billing cycle demand charge threshold based on historical loads from past billing cycles with a medium-term layer controller; and
      optimizing the demand charge threshold for a current period shorter than the billing cycle using the real-time load and the renewable energy source utilization with a short-term layer controller;
    predicting a net energy demand for a current day with a short-term forecaster;
    determining a demand threshold for maximizing financial savings using the net energy demand using a rolling time horizon optimizer by concurrently optimizing the savings associated with both the demand charge rates and the time-of-use rates, and the demand response rewards;
    determine a load reduction capability factor of one or more batteries with a real-time controller, the load reduction capability factor corresponding to an amount of energy required to fulfill a load reduction corresponding to at least one of the demand response rewards;
    comparing the net energy demand with the demand threshold to determine a demand difference with the real-time controller; and
    controlling battery charge levels of the one or more batteries with the real time controller according to the demand difference and the load reduction capability factor.

11. The method as recited in claim 10, wherein the billing cycle is one month.

12. The method as recited in claim 10, wherein the current period is one day.

13. The method as recited in claim 10, wherein determining the demand threshold includes:
    determining an optimum demand charge threshold for reducing demand charges; and
    determining firm service levels corresponding to demand response programs issued for a distribution network, wherein the demand threshold is defined by the firm service levels when the optimum demand charge threshold exceeds the firm service levels.

14. The method as recited in claim 10, further including determining demand response rewards by summing rewards and penalties associated with power demanded from the grid compared to firm service levels of demand response programs issued for a distribution network.

15. The method as recited in claim 10, wherein concurrently optimizing the savings includes:
    summing demand charge savings associated with the demand charge threshold with rewards associated with firm service levels of demand response programs issued for a distribution network to produce a total savings; and
    maximizing a reduction in the demand charge threshold according to the total savings.

16. The method as recited in claim 10, further including determining a battery state of charge to prevent discharge the one or more batteries below a minimum state of charge.

17. A behind the meter energy management system for controlling battery charge levels to maximize power demand savings, the system comprising:
    a power demand management controller that predicts a demand charge threshold based on historical load to reduce peak demand charges;
    a short-term forecaster that predicts a net energy demand for a current day;
    a rolling time horizon optimizer that determines a demand threshold for maximizing financial savings using the net energy demand by concurrently optimizing the savings associated with both the demand charge rates and the time-of-use rates, and the demand response rewards; and
    a real-time controller that controls battery charge levels, controlling the battery charge levels including:
      determining a load reduction capability factor of one or more batteries, the load reduction capability factor corresponding to an amount of energy required to fulfill a load reduction corresponding to at least one of the demand response rewards;

comparing the net energy demand with the demand threshold to determine a demand difference; and controlling battery charge levels of the one or more batteries according to the demand difference and the load reduction capability factor.

18. The behind the meter energy management system as recited in claim 17, further including a demand charge threshold optimizer that determines the demand threshold, including:

determining an optimum demand charge threshold for reducing demand charges; and determining firm service levels corresponding to demand response programs issued for a distribution network, wherein the demand threshold is defined by the firm service levels when the optimum demand charge threshold exceeds the firm service levels.

19. The behind the meter energy management system as recited in claim 17, further including a rewards optimizer that determines demand response rewards by summing rewards and penalties associated with power demanded from the grid compared to firm service levels of demand response programs issued for a distribution network.

20. The behind the meter energy management system as recited in claim 17, wherein the rolling time optimizer includes a rewards optimizer to concurrently optimize the savings, including:

summing demand charge savings associated with the demand charge threshold with rewards associated with firm service levels of demand response programs issued for a distribution network to produce a total savings; and maximizing a reduction in the demand charge threshold according to the total savings.

\* \* \* \* \*